United States Patent
Dye et al.

(10) Patent No.: US 9,548,001 B2
(45) Date of Patent: Jan. 17, 2017

(54) MOLECULAR MODELING SYSTEM INCLUDING MULTIPLE PI-BOND EXCLUSIONARY FEATURES

(71) Applicant: Molecularity LLC, Bishop, GA (US)

(72) Inventors: Bryson Dye, Athens, GA (US); James Konzelman, Bishop, GA (US)

(73) Assignee: MOLECULARITY LLC, Bishop, GA (US)

( * ) Notice: Subject to any disclaimer, the term of this patent is extended or adjusted under 35 U.S.C. 154(b) by 530 days.

(21) Appl. No.: 14/079,268

(22) Filed: Nov. 13, 2013

(65) Prior Publication Data

US 2015/0132734 A1      May 14, 2015

(51) Int. Cl.
  *G09B 23/26*      (2006.01)
(52) U.S. Cl.
  CPC .................................... *G09B 23/26* (2013.01)
(58) Field of Classification Search
  CPC ........................................................ G09B 23/26
  USPC ........................................................ 434/278
  See application file for complete search history.

(56) References Cited

U.S. PATENT DOCUMENTS

| 3,333,349 A * | 8/1967 | Brumlik | G09B 23/26 434/278 |
| 3,466,759 A * | 9/1969 | Brumlik | G09B 23/26 434/280 |

* cited by examiner

*Primary Examiner* — Robert J Utama
*Assistant Examiner* — Jennifer L Korb
(74) *Attorney, Agent, or Firm* — Mitch Harris, Atty at Law, LLC; Andrew M. Harris (57) ABSTRACT

A molecular modeling kit provides a system for molecular modeling that represents exclusion between resonance structures in a molecule and permits their rotation, providing an informative tool for describing resonance in a classroom or other learning environment. The kit includes atom modeling components and bond connector components that are connected together to form models of molecules. The atom modeling components or the bond connector components include a mechanical exclusion feature that prevents simultaneous connection of two bond connector components to represent two pi-bonds formed with a single atom in a single plane.

20 Claims, 6 Drawing Sheets

MOLECULAR MODELING SYSTEM INCLUDING MULTIPLE PI-BOND EXCLUSIONARY FEATURES

BACKGROUND OF THE INVENTION

1. Field of the Invention

The present invention relates generally to mechanical models for demonstrating molecular structure, and more particularly, to a molecular modeling system that prevents connection of or disconnects incorrect pi-bond representations, in a model of a resonating bond of an organic molecule.

2. Description of the Related Art

Molecular model kits provide valuable resources for instruction in chemistry and general sciences classrooms, as well as providing a low-cost educational item for individual use.

Molecular modeling kits typically include a variety of atom modeling components, which may be of different colors to represent different types of atoms. The kits also include interconnecting components used to represent bonds between the atoms which mechanically couple the atom modeling components to provide a structure that can be handled and sometimes stored without the structure easily coming apart.

However, typical molecular model kits are static, in that they do not provide a way to move elements that represent bonds. In particular, the typical modeling kits do not provide a way to represent the resonating behavior of some bonds, e.g., pi-bonds between Carbon atoms and other atoms, which may also be Carbon atoms. In particular they do not provide a way to dynamically model resonating pi-bonds in the multiple canonical forms of an organic molecule. Nor do typical modeling kits prevent insertion of improper bond representations, such as exceeding the valence number or orientation of p-orbitals of atoms by inserting two pi-bonds at one atom in the same plane. The typical modeling kit will permit static insertion of pi-bond representations at any location, rather than excluding pi-bond locations belonging to other resonance structures than the one being represented in a given configuration.

Therefore, it would be desirable to provide a molecular modeling system, molecular modeling components and a molecular modeling method that more accurately represent pi-bonds and bond resonance.

SUMMARY OF THE INVENTION

The objective of providing a molecular model system, components and method that more accurately represent higher-order bonds and resonance in a molecular model is provided in a system and method.

The system is a molecular modeling kit, and the components thereof, which are used in a molecular modeling method. The kit includes atom modeling components and bond connector components that are connected together to form models of molecules. The atom modeling components or the bond connector components include a mechanical exclusion feature that prevents simultaneous connection of two of the bond connector components to the atom modeling components to represent two pi-bonds formed with a single atom in the same plane. The molecular modeling kit further provides rotation of bond connectors representing pi-bonds so that the alternation of the pi-bond between two different canonical structures can be demonstrated.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present disclosure encompasses molecular modeling kits that have rotating features that allow rotation of a bond connector to represent different locations of a pi-bond in different canonical forms of a resonance model. The model also includes mechanical exclusionary features that prevent a model from including simultaneous representation of pi-bonds formed in the same plane with a single Carbon atom, or other atom supporting a covalent bond, e.g., Nitrogen, Oxygen, or one of the halogens. When insertion of a new pi-bond is attempted in the same plane, the exclusion feature may prevent such construction, or cause an existing pi-bond to disconnect so the valence of the atom is not exceeded in the representation.

Figure 1A:
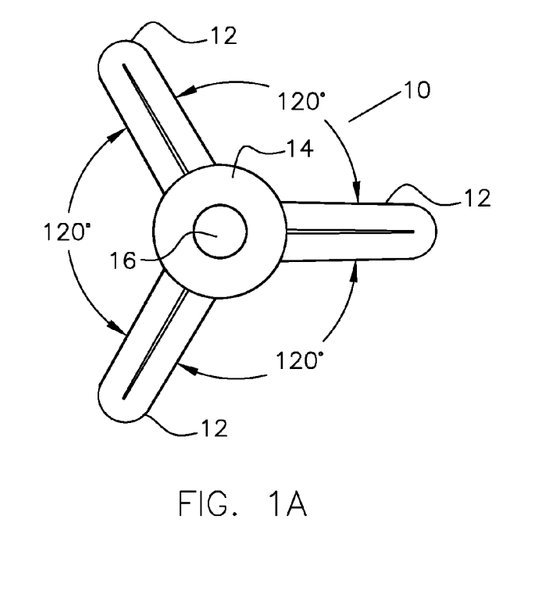
FIG. 1A is a top view and FIG. 1B is an isometric view of a first type of atom modeling component as included in an exemplary molecular modeling kit.
Figure 1B:
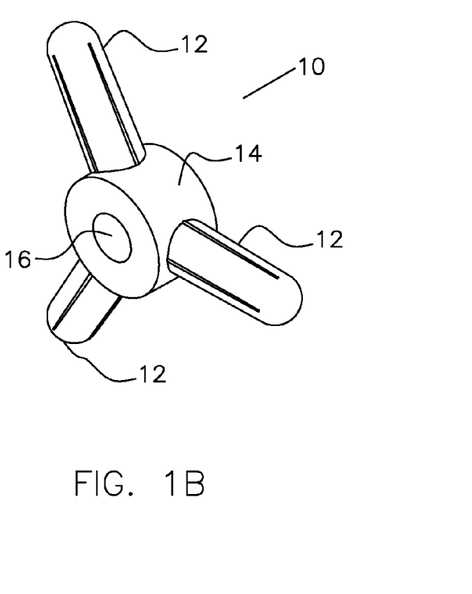

Referring now to FIGS. 1A-1B, an atom-modeling component 10 of an exemplary modeling kit is shown in a top view and an isometric view, respectively. As illustrated, atom-modeling component 10 includes a recess 16 within a body 14 of atom-modeling component 10, providing a connecting feature for connection of another atom-modeling component that forms part of a representation of a single atom with atom-modeling component 10 as will be described below. For purposes of the example, the atoms represented in the model may be Carbon atoms, or another type of atom, such as Nitrogen, Oxygen or one of the halogens. Atom-modeling component 10 also includes three protrusions 12, providing bond-connector attachment features for attachment of bond-connectors representing sigma-bonds in a model of a molecule. The orientation of protrusions 12 is symmetric within a plane that cuts through body 14 of atom-modeling component 10 perpendicular to recess 16. Atom-modeling component 10 is used in a molecular model to provide connections of sigma-bonds to a representation of a single atom, which is the first of two bond connections to the modeled atom from another atom when the bond is a resonating bond.

Figure 2A:
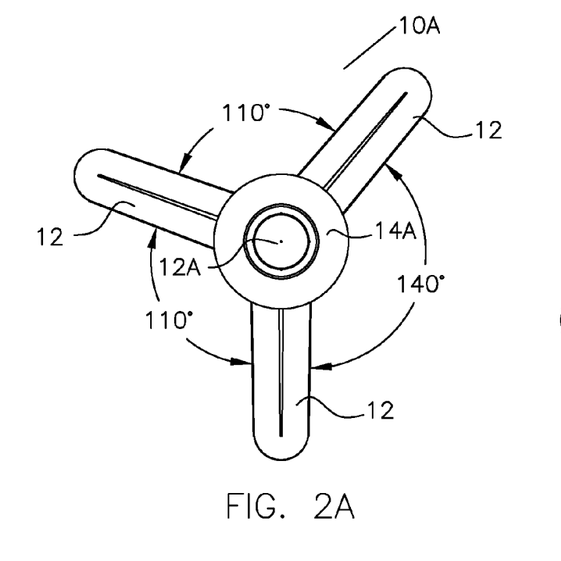
FIG. 2A is a top view and FIG. 2B is an isometric view of a second type of atom modeling component as included in the exemplary molecular modeling kit.
Figure 2B:
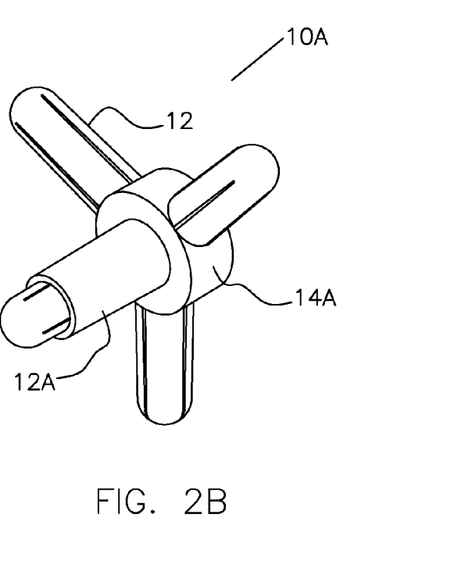

Referring now to FIGS. 2A-2B, an atom-modeling component 10A of the exemplary modeling kit is shown in a top view and an isometric view, respectively. As illustrated, atom-modeling component 10A includes a protrusion 12A extending from body 14A providing a connecting feature for connection of one of atom-modeling components 10 that forms the other portion of the model of a single atom, and three protrusions 12 providing bond-connector attachment features for attachment of bond-connectors representing pi-bond locations. The orientation of protrusions 12 is asymmetric within a plane that cuts through the body of modeling component 10A perpendicular to protrusion 12A. In the example, the angular displacement between two pairs of the protrusions 12 in the plane of protrusions 12 is 110 degrees each, leaving a displacement of 140 degrees between the last pair of protrusions. Atom-modeling component 10A is used in a molecular model to represent a pi-bond connection, which is the second of two bonds between the single atom and another atom when the bond is a resonating bond.

Figure 3A:
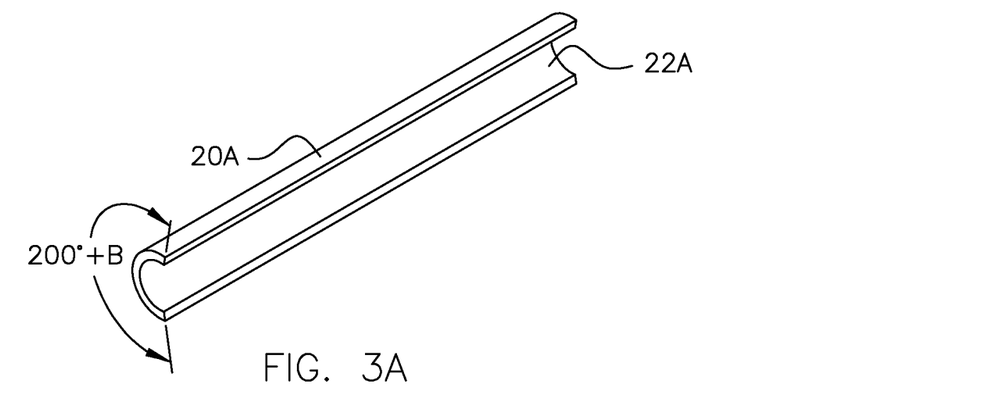
FIG. 3A is an isometric view of a first type of bond connector component as included in the exemplary molecular modeling kit.

Referring now to FIG. 3A, a bond-connector component 20A of the exemplary modeling kit is shown in an isometric view. As illustrated, bond-connector component 20A is made from a flexible material and forms a tubular structure with a circumference extending over only a portion of a circular cross-section. A void 22A within bond-connector component 20A is used to mate with protrusions 12 of atom-modeling components 10A, and in particular is used to attach the pi-bonds between atom-modeling components 10A. If rotation of an atom-modeling component 10A is attempted while bond-connector component 20A is attached to another atom-modeling component 10A by bond-connector component 20A, bond-connector component 20A will easily detach without breaking or preventing the rotation.

Figure 3B:
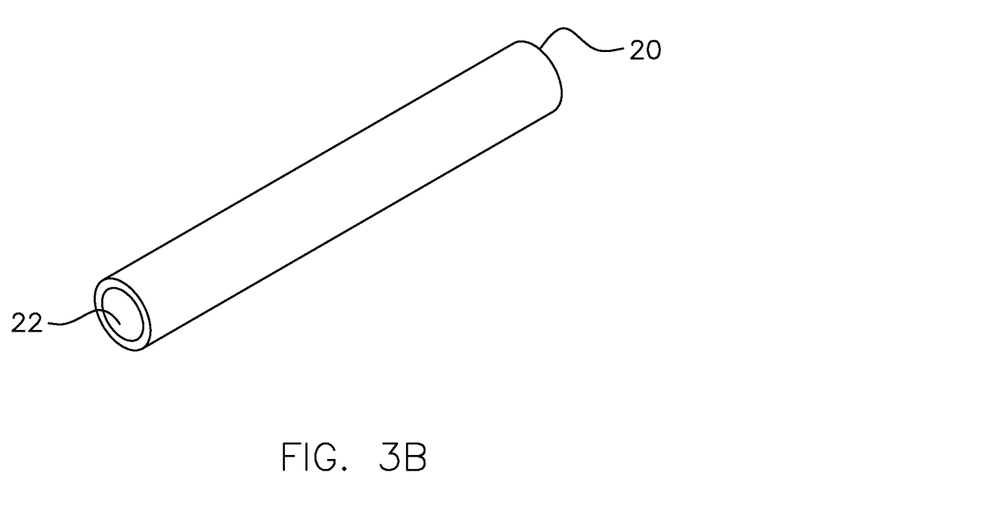
FIG. 3B is an isometric view of a second type of bond connector component as included in the exemplary molecular modeling kit.

Referring now to FIG. 3B, a bond-connector component 20 of the exemplary modeling kit is shown in an isometric view. As illustrated, bond-connector component 20 is made from a flexible material and forms a tubular structure with a circumference extending around a complete circular cross-section. A void 22 within bond-connector component 20 is used to mate with protrusions 12 of atom-modeling components 10, and in particular is used to attach sigma bonds between modeling components 10 representing atoms.

Figure 4A:
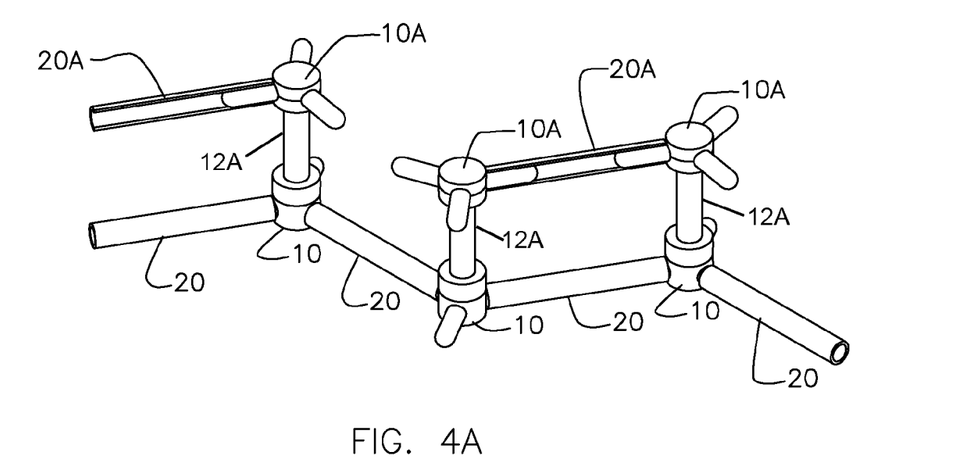
FIG. 4A is an isometric view and FIG. 4B is a top view of a molecular model constructed with the exemplary modeling kit and showing a first resonance structure of a molecule.
Figure 4B:
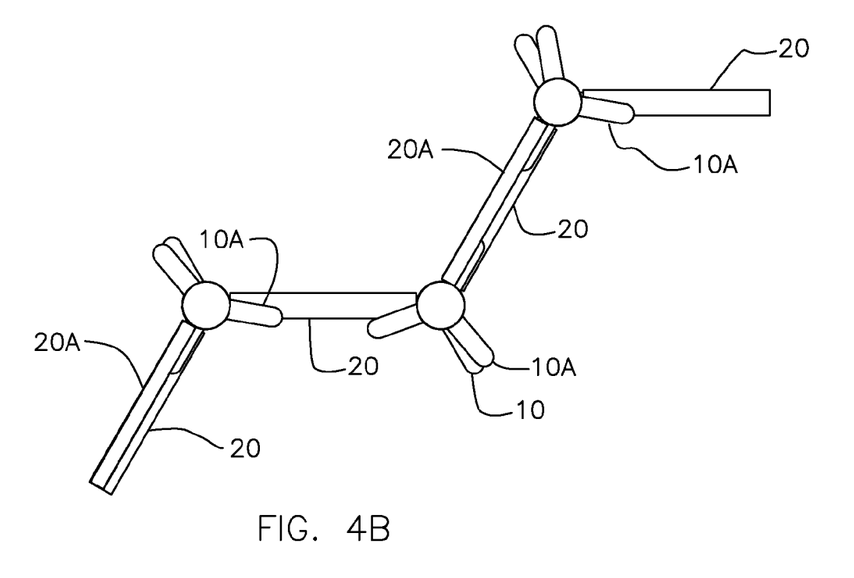

Referring now to FIGS. 4A-4B, a molecular model constructed using the exemplary molecular modeling kit, including the components as described above, is shown in an isometric view and a top view, respectively. As illustrated, atom-modeling components 10, disposed at the bottom of the model, are interconnected by bond-connector components 20 to represent sigma-bonds between atoms, while the upper layer of atom-modeling components 10A are interconnected by bond-connector components 20A, to represent resonating pi-bonds. Protrusions 12A of atom-modeling components 10A are inserted in recesses 16 of atom-modeling components 10, to form pairs of atom-modeling components 10, 10A. The pairs of atom-modeling components 10 and 10A do not represent separate atoms, but rather provide a mechanism for modeling a single atom while providing for representation of both sigma and pi-bonds separately.

Figure 5A:
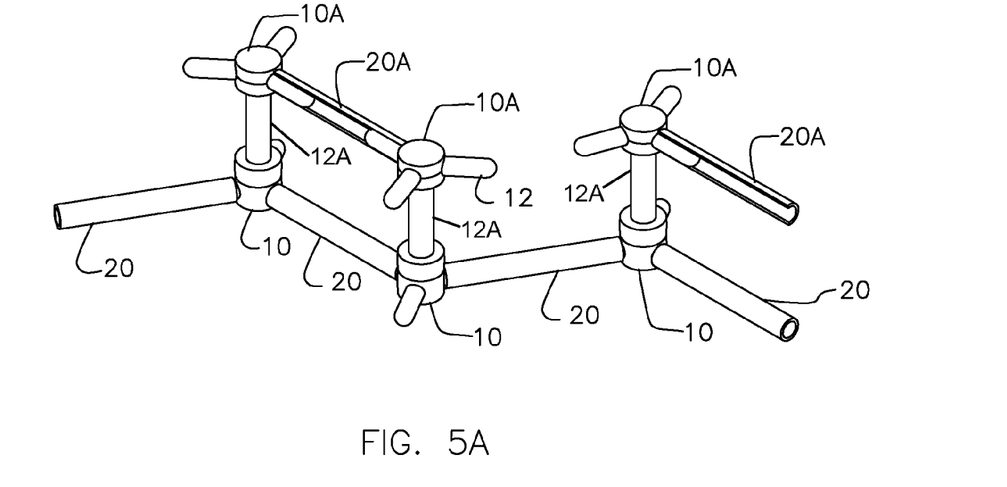
FIG. 5A is an isometric view and FIG. 5B is a top view of a molecular model constructed with the exemplary modeling kit and showing a second resonance structure of the molecule.
Figure 5B:
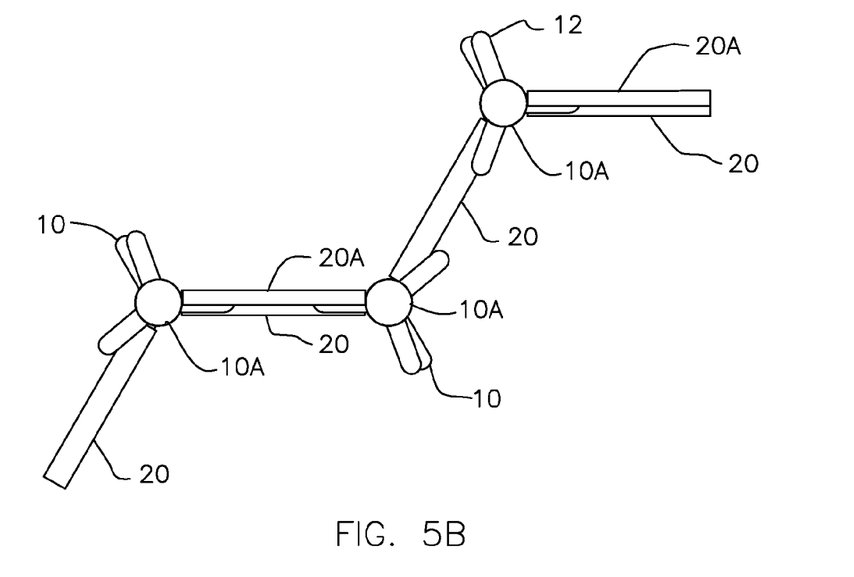

Referring now to FIGS. 5A-5B, a transformation of the molecular model of FIGS. 4A-4B is shown in an isometric view and a top view, respectively. As illustrated, atom-modeling components 10 and bond-connector components 20 remain in the same locations as shown in FIGS. 4A-4B, but atom-modeling components 10A have rotated as bond-connector components 20A have been moved to represent another canonical form of the molecule due to the resonating pi bond. Bond-connector components 20A can be detached from one of atom-modeling components 10A, while remaining attached to another one of atom-modeling components 10A. The detached end of a bond-connector component 20A can then be moved to a new location once the corresponding atom-modeling component 10A has been rotated so that a protrusion 12 of the corresponding atom-modeling component 10A is aligned to support connection of the previously detached bond-connector component 20A. Alternatively, if atom-modeling components 10A are forced to rotate to the new alignment, then bond-connector components 20A will detach due to the difference in the directions of the protrusions 12 of the atom-modeling component 10A and atom-modeling component 10, which is permitted without breaking or bending the bond-connector components 20A due to the gap in their circumference.

Figure 6A:
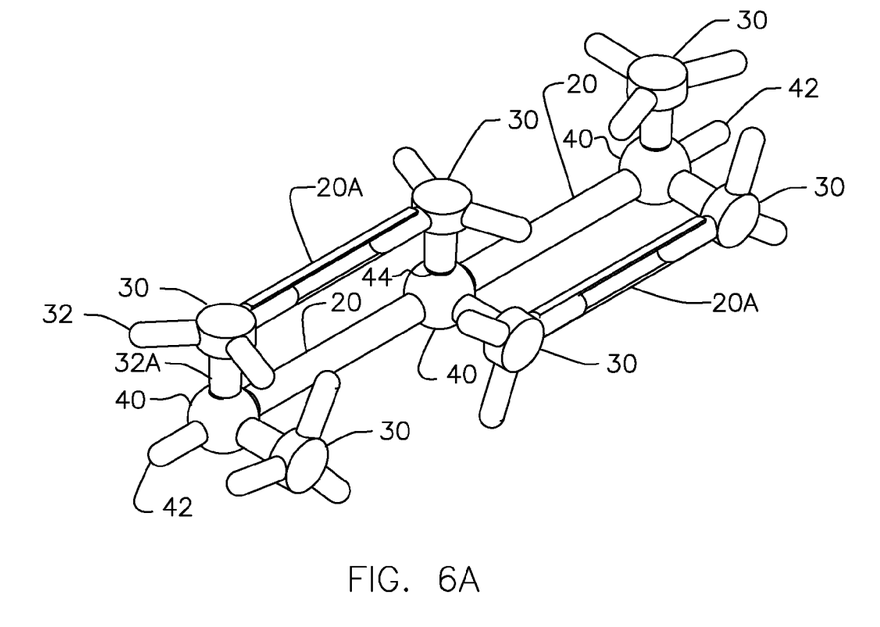
FIG. 6A is an isometric view and FIG. 6B is a top view of a molecular model constructed with the exemplary modeling kit and showing a model of another molecule.
Figure 6B:
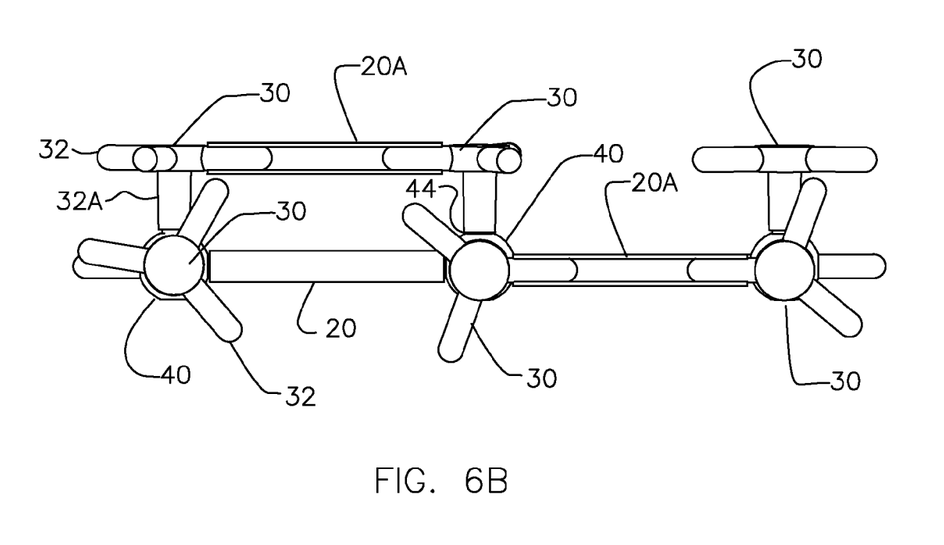

Referring now to FIGS. 6A-6B, a molecular model constructed using the exemplary molecular modeling kit is shown in an isometric view and a top view, respectively. An alternative form of an atom-modeling component 40 is provided to permit connection of a second pi-bond between adjacent atoms in the model by including protrusions 42 in line with the direction of bond-connector components 20 and recesses 44 perpendicular to that direction for connection of another additional atom-modeling component 30. Additional atom-modeling component 30 includes three protrusions 32 for connection of one of bond-connector components 20 representing sigma-bonds and also bond-connector components 20A representing pi-bonds. Atom-modeling component 30 also includes another protrusion 32A having a tip with a reduced profile designed to mate with recesses 44 of atom-modeling components 40. Atom-modeling components 30 have protrusions 32 asymmetrically disposed within the plane that cuts through the body of atom-modeling component 30, which in the example are disposed for two of the pairs at separation angles of 110 degrees and for the remaining pair at 140 degrees, as in atom-modeling component 10A in FIGS. 1A-1B described above, and thus will permit connection of only one bond-connector component 20A that is attached to another atom-modeling component 30 within the same plane. As illustrated, one canonical form of the resonance structure shown in FIGS. 6A-6B has a pi-bond represented by bond-connector components 20A that interconnect atom-modeling components 30 disposed above bond-connector component 20 that interconnects atom-modeling components 40. Another second pi-bond modeled by a bond-connector component 20A is disposed adjacent to (i.e., to the side of) bond-connector component 20 in the upper right portion of FIG. 6A, which is supportable because the second pi-bond is in a plane orthogonal to the plane of the first pi-bond, i.e., the bonds lie at 90 degree angles with respect to each other.

Figure 7A:
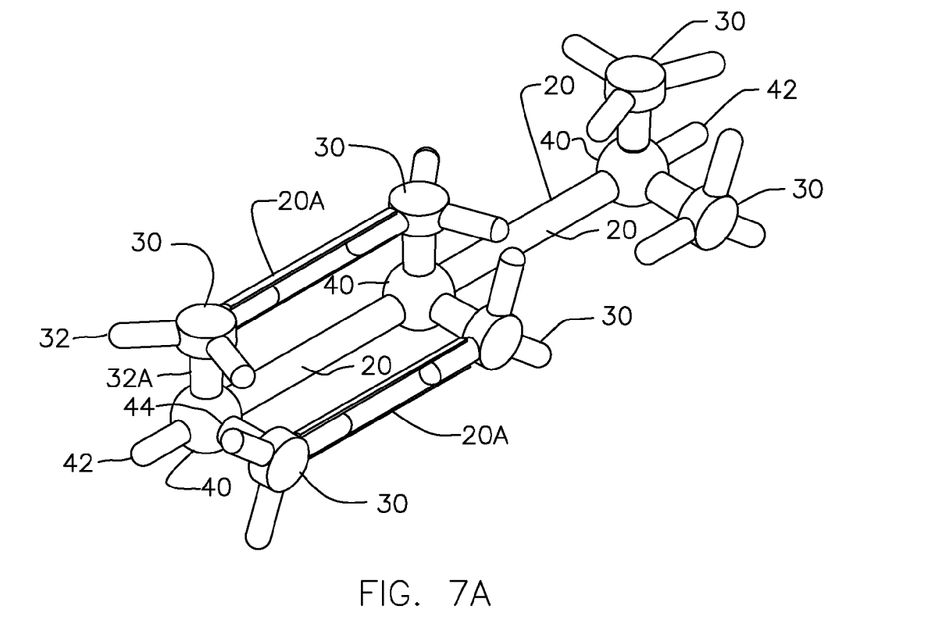
FIG. 7A is an isometric view and FIG. 7B is a top view of a molecular model constructed with the exemplary modeling kit and showing a model of yet another molecule.
Figure 7B:
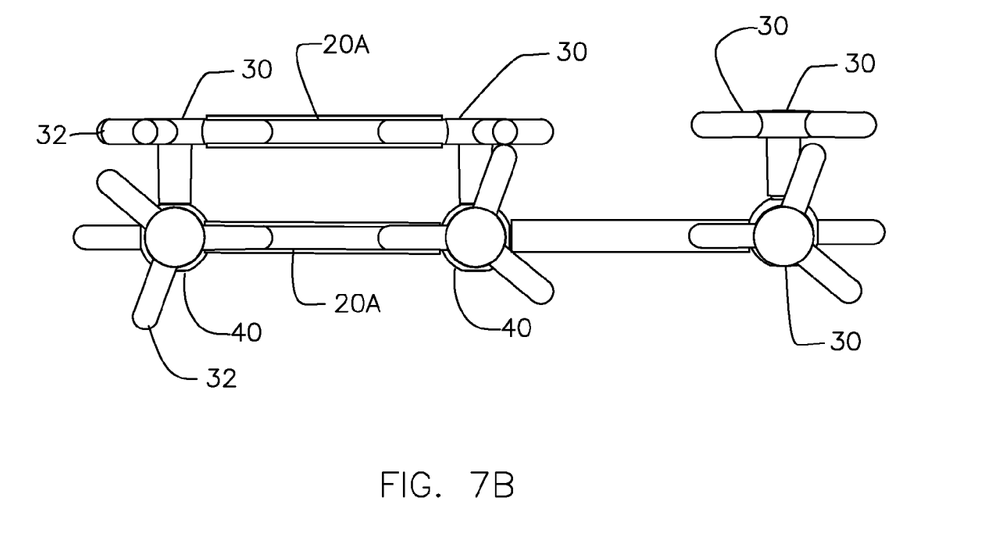

Referring now to FIGS. 7A-7B, a transformation of the molecular model of FIGS. 6A-6B is shown in an isometric view and a top view, respectively. As illustrated, atom-modeling components 30 and bond-connector components 20 remain in the same locations as shown in the right side of FIGS. 6A-6B. However, atom-modeling components 30 at the top of the model have rotated as the bond-connector component 20A from the left side of the figure has been moved to represent another canonical form of the molecule due to the resonating bond, which in the example is a triple bond. Bond-connector component 20 in the left hand side of FIGS. 6A-6B is disconnected since both pi-bond valences previously shown in FIGS. 6A-6B are involved in the triple bond, along with the sigma-bond.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A system for modeling a structure of a molecule, the system comprising:
    a plurality of atom-modeling components, wherein the atom-modeling components include bond-connector attachment features arranged in a bond-connector attachment plane of a body of the atom-modeling components and connecting features for forming connections between atom-modeling components in a direction extending out of the bond-connector attachment plane to represent a single atom; and
    a plurality of bond-connector components for connecting the bond-connector attachment features of the atom-modeling components in various configurations, wherein the bond-connector attachment features are disposed at a first set of directions within the bond-connector attachment plane for a first type of the atom-modeling components used to attach first ones of the bond-connector components providing sigma-bond representations, and wherein the bond-connector attachment features are disposed at a second set of directions within the bond-connector attachment plane for a second type of the atom-modeling components used to attach second ones of the bond-connector components providing pi-bond representations, wherein the first set of directions differ from the second set of directions to provide a mechanical exclusion feature that prevents simultaneous connection of two of the bond-connector components between a first pair of the atom-modeling components connected via the connecting features of the first pair of the atom-modeling components to represent a first atom and a second pair of the atom-modeling components connected via the connecting features of the second pair of the atom-modeling components to represent a second atom, while permitting simultaneous connection of two of the bond-connector components between the first pair of the atom-modeling components and a third pair of the atom-modeling components connected via the connecting features of the third pair of the atom-modeling components to represent a third atom.

2. The system of claim 1, wherein the bond-connector attachment features are protrusions for insertion within corresponding recesses of the bond-connector components.

3. The system of claim 1, wherein the first set of directions are symmetrically disposed at rotational spacings of 120 degrees of rotation around the body of the corresponding atom-modeling component within the single plane, and the second set of directions are asymmetrically disposed at two equal rotational spacings of less than 120 degrees and another rotational spacing of greater than 120 degrees around the body of the corresponding atom-modeling component within the single plane.

4. The system of claim 1, wherein first connecting features of the first type of atom-modeling components differ from second connecting features of the second type of atom-modeling components to prevent interchanging atom-modeling components of the first type with atom-modeling components of the second type in order to simultaneously connect two of the second bond-connector components representing pi-bonds to the at least one atom-modeling component representing the single atom.

5. The system of claim 4, wherein the first connecting features are mating recesses extending into the body of the corresponding atom-modeling component and perpendicular to the single plane, and wherein the second connecting features are mating protrusions extending from the body of the corresponding atom-modeling component and perpendicular to the single plane, and wherein the system further comprises a plurality of short tubes and a plurality of adapters having a pair of protrusions extending in opposite directions and having substantial body thickness, so that when an adapter is mated with a mating recess of an atom-modeling component of the first type, the combined adapter and atom-modeling component can be attached by a short tube to the protrusion of an atom-modeling component of the second type, but cannot be interchanged with an atom-modeling component of the second type.

6. The system of claim 1, wherein the bond-connector components are hollow tubes having a circular cross-section.

7. The system of claim 6, wherein a material of at least some of the bond-connector components extends over only a portion of a circumference of the circular cross section, whereby an opening is formed along at least a portion of a side of the corresponding bond-connector components, so that the protrusion can disconnect laterally when the protrusion is rotated in the single plane of the corresponding atom-modeling component.

8. The system of claim 7, wherein the at least some bond-connector components are formed from a flexible material, and wherein the material of the at least some bond-connector components extend over greater than half of the circumference of the circular cross section, so that the protrusions are retained within the bond-connector components unless sufficient force is applied to displace the material of the at least some bond-connector components adjacent to the opening.

9. The system of claim 8, wherein the material of the at least some bond-connector components extend over 200 degrees of the circumference of the circular cross section.

10. The system of claim 3, wherein the second set of directions are asymmetrically disposed at two rotational spacings of 110 degrees and a rotational spacing of 140 degrees around the body of the of the corresponding atom-modeling component within the single plane.

11. A system for modeling a structure of a molecule, the system comprising:
    a plurality of atom-modeling components having protrusions disposed in a plane of a body of the individual atom-modeling components, wherein the protrusions extend in first set of directions within a first type of the atom-modeling components and extend in a second set of directions that differs from the first set of directions for a second type of the atom-modeling components; and a plurality of bond-connector components for connecting the atom-modeling components in various configurations, wherein the differences between the first set of directions and the second set of directions provide a mechanical exclusion feature that prevents connection of two of the bond-connector components from a first pair of two interconnected atom-modeling components representing a single atom to a second pair of two interconnected atom-modeling components representing another atom while two bond-connector components are connected from the first pair of the atom-modeling components to a third pair of two interconnected atom-modeling components, wherein the bond-connector components are hollow tubes having a circular cross-section, wherein a material of at least some of the bond-connector components extends over only a portion of a circumference of the circular cross section, whereby an opening is formed along at least a portion of a side of the corresponding bond-connector components, so that the protrusion can disconnect laterally when the protrusion is rotated in the single plane of the corresponding atom-modeling component.

12. The system of claim 11, wherein the at least some bond-connector components are formed from a flexible material, and wherein the material of the at least some bond-connector components extend over greater than half of the circumference of the circular cross section, so that the protrusions are retained within the bond-connector components unless sufficient force is applied to displace the material of the at least some bond-connector components adjacent to the opening.

13. The system of claim 12, wherein the material of the at least some bond-connector components extend over 200 degrees of the circumference of the circular cross section.

14. A method of modeling a structure of a molecule, the method comprising:

interconnecting a plurality of atom-modeling components having bond-connector attachment features arranged in a bond-connector attachment plane of a body of the atom-modeling components and connecting features for forming connections between atom-modeling components in a direction extending out of the bond-connector attachment plane to represent a single atom, by connecting groups of two or more of the atom-modeling components to represent atoms and connecting the groups of atom-modeling components together with a plurality of bond-connector components by connecting the bond-connector attachment features of the atom-modeling components in various configurations; and preventing simultaneous connection of two of the bond-connector components to at least one of the atom-modeling components in one of the groups of atom-modeling components representing a single atom to represent formation of two pi-bonds with the single atom in a single plane, by the bond-connector attachment features being disposed at a first set of directions within the bond-connector attachment plane for a first type of the atom-modeling components used to attach first ones of the bond-connector components providing sigma-bond representations, and in the bond-connector attachment features being disposed at a second set of directions within the bond-connector attachment plane for a second type of the atom-modeling components used to attach second ones of the bond-connector components providing pi-bond representations, wherein the first set of directions differ from the second set of directions to provide a mechanical exclusion feature that prevents simultaneous connection of two of the bond-connector components between a first group of the atom-modeling components connected via the connecting features of the first group of the atom-modeling components to represent a first atom and a second group of the atom-modeling components connected via the connecting features of the second group of the atom-modeling components to represent a second atom, while permitting simultaneous connection of two of the bond-connector components between the first group of the atom-modeling components and a third group of the atom-modeling components connected via the connecting features of the third group of the atom-modeling components to represent a third atom.

15. The method of claim 14, wherein the interconnecting comprises insertion of protrusions of atom-modeling components within corresponding recesses of the bond-connector components.

16. The method of claim 14, wherein the first set of directions are symmetrically disposed at rotational spacings of 120 degrees of rotation around the body of the corresponding atom-modeling component within the single plane, and the second set of directions are asymmetrically disposed at two equal rotational spacings of less than 120 degrees and another rotational spacing of greater than 120 degrees around the body of the of the corresponding atom-modeling component within the single plane.

17. The method of claim 14, wherein first connecting features of the first type of atom-modeling components differ from second connecting features of the second type of atom-modeling components to prevent interchanging atom-modeling components of the first type with atom-modeling components of the second type in order to simultaneously connect two of the second bond-connector components representing pi-bonds to the at least one atom-modeling component representing the single atom.

18. The method of claim 17, wherein the first connecting features are mating recesses extending into the body of the corresponding atom-modeling component and perpendicular to the single plane, and wherein the second connecting features are mating protrusions extending from the body of the corresponding atom-modeling component and perpendicular to the single plane, and wherein the interconnecting further interconnects a plurality of short tubes and a plurality of adapters having a pair of protrusions extending in opposite directions and having substantial body thickness, so that when the interconnecting interconnects an adapter with a mating recess of an atom-modeling component of the first type, the combined adapter and atom-modeling component can be attached by a short tube to the protrusion of an atom-modeling component of the second type, but cannot be interchanged with an atom-modeling component of the second type.

19. The method of claim 14, wherein the bond-connector components are hollow tubes having a circular cross-section.

20. The method of claim 19, wherein a material of at least some of the bond-connector components extends over only a portion of a circumference of the circular cross section, whereby an opening is formed along at least a portion of a side of the corresponding bond-connector components, so that the protrusion can disconnect laterally when the protrusion is rotated in the single plane of the corresponding modeling component.

\* \* \* \* \*